(12) United States Patent
Burger

(10) Patent No.: US 10,148,194 B2
(45) Date of Patent: Dec. 4, 2018

(54) PULSE-CONTROLLED INVERTER

(71) Applicant: Robert Bosch GmbH, Stuttgart (DE)

(72) Inventor: Dennis Burger, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/562,515

(22) PCT Filed: Jan. 29, 2016

(86) PCT No.: PCT/EP2016/051889
§ 371 (c)(1),
(2) Date: Sep. 28, 2017

(87) PCT Pub. No.: WO2016/155908
PCT Pub. Date: Oct. 6, 2016

(65) Prior Publication Data
US 2018/0097455 A1    Apr. 5, 2018

(30) Foreign Application Priority Data

Apr. 1, 2015   (DE) .................. 10 2015 205 881

(51) Int. Cl.
*H02M 7/537*    (2006.01)
*H02M 7/00*     (2006.01)
(Continued)

(52) U.S. Cl.
CPC ............. *H02M 7/537* (2013.01); *H02M 1/44* (2013.01); *H02M 7/003* (2013.01); *H02M 7/48* (2013.01);
(Continued)

(58) Field of Classification Search
CPC .......... H02M 1/44; H02M 7/003; H02M 7/44; H02M 7/48; H02M 7/4826; H02M 7/515;
(Continued)

(56) References Cited

U.S. PATENT DOCUMENTS 5,617,308 A * 4/1997 Weise ................ H02M 7/4826
                                                           363/132
7,085,144 B2 * 8/2006 Taguchi ................. H02M 1/12
                                                           361/328
(Continued)

FOREIGN PATENT DOCUMENTS

EP          2824815        1/2015

OTHER PUBLICATIONS

International Search Report for Application No. PCT/EP2016/051889 dated Apr. 22, 2016 (English Translation, 3 pages).
(Continued)

*Primary Examiner* — Matthew Nguyen
(74) *Attorney, Agent, or Firm* — Michael Best & Friedrich LLP

(57) ABSTRACT

A pulse-controlled inverter with a circuit providing a DC voltage between high-side and low-side inputs. In one example, the circuit includes a first high-side stray capacitance and inductance and a first low-side stray capacitance and inductance. A busbar arrangement is configured to connect the high-side input to a high-side connection and the low-side input to a low-side connection. The busbar arrangement includes a second high-side stray capacitance and inductance and a second low-side stray capacitance and inductance. An inverter module is coupled to the high-side connection and the low-side connection and configured to convert the DC voltage into an AC voltage. The inverter module has a third high-side stray capacitance and inductance and a third low-side stray capacitance and inductance. The sum of the first, second, and third high-side stray capacitance and inductance is substantially equal to the sum of the first, second, and third low-side stray capacitance and inductance.

10 Claims, 1 Drawing Sheet

(51) Int. Cl.
*H02M 7/48* (2007.01)
*H02M 7/5387* (2007.01)
*H02M 1/44* (2007.01)

(52) U.S. Cl.
CPC ....... *H02M 7/4826* (2013.01); *H02M 7/5387* (2013.01)

(58) Field of Classification Search
CPC ...... H02M 7/523; H02M 7/525; H02M 7/527; H02M 7/53; H02M 7/537
See application file for complete search history.

(56) References Cited

U.S. PATENT DOCUMENTS

| | | | |
|---|---|---|---|
| 2007/0091652 A1* | 4/2007 | Hirota | H02M 7/003 363/37 |
| 2010/0226159 A1* | 9/2010 | Stern | H02M 7/5395 363/132 |
| 2011/0094075 A1 | 4/2011 | Lee et al. | |
| 2011/0292686 A1 | 12/2011 | Oka et al. | |
| 2012/0229948 A1 | 9/2012 | Sawyer et al. | |

OTHER PUBLICATIONS

Fang et al., "Design of Hybrid Busbar Filter Combining a Transmission-Line Busbar Filter and a One-Turn Inductor for DC-Fed Three-Phase Motor Drive Systems," IEEE Transactions on Power Electronics, Institute of Electrical and Electronics Engineers, USA, vol. 28, No. 12, Dec. 1, 2013, pp. 5588-5602, XP011514328.

* cited by examiner

PULSE-CONTROLLED INVERTER

BACKGROUND OF THE INVENTION

The invention relates to a pulse-controlled inverter with minimized electromagnetic interference emission.

Although the present invention and the problem on which it is based are explained on the basis of an electric vehicle having a pulse-controlled inverter, they are also applicable to any other electrical drive systems having clocked, electrically powered inverters.

In an electrical drive system of an electric vehicle or a hybrid electric vehicle, a polyphase voltage is usually fed into an electric machine by an inverter, for example in the form of a pulse-controlled inverter. For this purpose, an energy storage device, such as a high-voltage battery, can energize a DC link circuit, which for its part provides a DC voltage that can be converted into a polyphase AC voltage, for example a three-phase AC voltage, in order to feed the electric machine.

To that end, conventional pulse-controlled inverters (PCI) comprise typically at least three fundamental components. On the input side, a DC link capacitor is typically used to couple a DC voltage into the DC link circuit. The DC link capacitor is connected to one or more power modules by means of a low-inductance electrical connection, e.g. in the form of two busbars made of copper. In this case, the busbar that is connected to a first output connection of the DC link circuit can be referred to as high-side busbar and the busbar that is connected to a second output connection of the DC link circuit can be referred to as low-side busbar. In order to generate a three-phase output voltage, a power module is typically embodied with three bridge branches each having two semiconductor switches. Accordingly, the semiconductor switches of the bridge branches that are connected to the high-side busbar are referred to as high-side switches and the semiconductor switches of the bridge branches that are connected to the low-side busbar are referred to as low-side switches, respectively. Examples of semiconductor switches that can be used here are IGBT (insulated-gate bipolar transistor) modules with a diode connected in antiparallel or MOSFETs (metal-oxide-semiconductor field-effect transistors) or the like. The power module usually operates with pulse-width-modulated drive signals for the semiconductor switches in order to generate the polyphase output voltage.

In addition to their desired electrical properties, all three components of a pulse-controlled inverter, i.e. the DC link capacitor, the electrical connection by means of busbars and the power module, have undesired stray variables as well, i.e. stray capacitances and stray inductances. On account of the stray variables, clocking the individual half bridges in the converter generates transient electrical interference variables that can propagate in the system. As a result, these undesired output coupling points can lead, inter alia, to line-based interference emissions in the energizing DC voltage grid of the inverter. However, said line-based interference emissions can be kept as low as possible by virtue of the fact that all of the subcomponents of the system per se are arranged symmetrically between the high side and the low side with regards to the stray variables. One challenge here is, in particular, the symmetrical arrangement of the power modules with regard to their stray variables.

The document Domurat-Line A., Hoene E. "Analysis and Reduction of Radiated EMI of Power Modules", 7th International Integrated Power Electronics Systems Conference (CIPS), 2012 discloses, for example, power modules that are arranged on the basis of flip-chip technology, in which the low-side switches are soldered on "overhead". Said flip-chip technology can be readily implemented for prototypes, but series production with large quantities based on commercially available IGBT modules is difficult.

A simpler, alternative design is thus required in order to minimize the line-based interference emissions of clocked, electrically powered inverters.

SUMMARY OF THE INVENTION

In accordance with one aspect, the present invention provides a pulse-controlled inverter. The pulse-controlled inverter comprises an input circuit, which is configured to provide a DC input voltage between a high-side input and a low-side input. The input circuit has a first high-side stray capacitance, a first low-side stray capacitance, a first high-side stray inductance and a first low-side stray inductance. The pulse-controlled inverter further comprises a busbar arrangement, which is configured to electrically connect the high-side input to a high-side connection and to electrically connect the low-side input to a low-side connection. The busbar arrangement has a second high-side stray capacitance, a second low-side stray capacitance, a second high-side stray inductance and a second low-side stray inductance. The pulse-controlled inverter further comprises an n-phase inverter module, n>1, which is electrically coupled to the high-side connection and the low-side connection and is configured to convert the DC input voltage into an n-phase AC output voltage. The inverter module has a third high-side stray capacitance, a third low-side stray capacitance, a third high-side stray inductance and a third low-side stray inductance. The sum of the first, the second and the third high-side stray capacitance is substantially equal to the sum of the first, the second and the third low-side stray capacitance. Furthermore, the sum of the first, the second and the third high-side stray inductance is substantially equal to the sum of the first, the second and the third low-side stray inductance wherein, in particular, the difference between at least one of the first, second or third high-side stray capacitance and the corresponding low-side stray capacitance is not equal to zero and/or the difference between at least one of the first, second or third high-side stray inductance and the corresponding low-side stray inductance is not equal to zero.

In accordance with a further aspect, the present invention provides an n-phase electric machine, wherein n>1, which has a pulse-controlled inverter according to the invention. The n-phase electric machine is coupled to the n-phase AC output voltage of the pulse-controlled inverter.

It is a concept of the present invention to provide a pulse-controlled inverter having minimal (common-mode) interference emission, in which the subcomponents in each case do not have to be arranged symmetrically per se with regard to their stray variables, i.e. stray capacitances and stray inductances. In this context, symmetry means that the stray variables of the components on the high side substantially correspond to those on the low side, i.e. the components are symmetrical between the high and low side in relation to their stray variables. Asymmetries in the subcomponents normally lead to increased common-mode interference emissions. The reason for this is that the asymmetries cause the commutation circuit currents of the system to undergo "differential mode-common mode conversion".

Although DC link capacitors and busbars can be embodied symmetrically with relatively little complexity, the symmetrical embodiment of an inverter power module in particular presents a challenge. The present invention addresses this problem to a certain extent. The present invention is based on the knowledge that asymmetries that are present in subcomponents can be compensated for by "opposing" asymmetries in other subcomponents of the system. In this context, the system is not arranged symmetrically on the plane of the subcomponents but is symmetrical on the commutation circuit plane. Therefore, an asymmetry in an inverter power module that can only be avoided using complex means can be balanced out by correspondingly purposefully selected opposing asymmetries in the input circuit or the busbar arrangement. The input circuit and/or the busbar arrangement can each be appropriately adapted and optimized, building on the specific embodiment of the power module.

Interference emissions can be successfully suppressed as long as the stray variables are balanced cumulatively across all components of the DC link. For this purpose, the following equations specifically have to be at least approximately satisfied:

$$\Sigma C_{HS} = \Sigma C_{LS}$$

and $$\Sigma L_{HS} = \Sigma L_{LS},$$

wherein HS denotes the high side, LS denotes the low side, $\Sigma C$ denotes the sum across all individual stray capacitances and $\Sigma L$ denotes the sum across all individual stray inductances. The sum of the individual stray capacitances on the high side must therefore be substantially equal to the sum of the individual stray capacitances on the low side. Likewise, the sum of the individual stray inductances on the high side must be substantially equal to the sum of the individual stray inductances on the low side.

The solution according to the invention has the significant advantage that, inter alia, inexpensive, asymmetrical power modules can be used for a pulse-controlled inverter, without increasingly line-based interference emissions arising. Subsequently, less outlay in terms of filters etc. is required in order to satisfy the corresponding limit values for the electromagnetic compatibility (EMC). The system according to the invention is thus not only inexpensive, but is also characterized by high efficiency and improved energy balance, as power losses can be kept to a minimum. Pulse-controlled inverters according to the invention can be used in various fields of application of electric machines. For example, in addition to electric and hybrid electric vehicles, said pulse-controlled inverters according to the invention may also be used in inverter-energized industrial drives or the like.

In accordance with one development, the input circuit may comprise a DC link capacitor. The DC link capacitor may provide the DC input voltage between the high-side input and the low-side input. In a particularly simple development, the input circuit may only consist of the DC link capacitor, which receives the input voltage, for example from an energy storage device such as a high-voltage battery, and provides said voltage for the inverter.

The DC link capacitor may be embodied as a film capacitor. In this case, the capacitor has very thin, insulating plastic films as dielectric, which are metallized or coated with metal films and are very closely wound or layered one above the other.

The busbar arrangement may furthermore be integrated into the DC link capacitor in a space-saving manner.

In accordance with one development, the busbar arrangement may comprise a high-side busbar and a low-side busbar. The high-side busbar may electrically connect the high-side input to the high-side connection. The low-side busbar may electrically connect the low-side input to the low-side connection. In a particularly simply designed embodiment, two busbars, for example made of copper or a similar suitable material, can therefore connect the input circuit to the inverter module as a result.

In accordance with one development, the n-phase inverter module may have a bridge branch for each phase, each bridge branch being composed of a high-side power semiconductor switch and a low-side power semiconductor switch. This development is a possible simple form of the embodiment of an inverter module that is simple to control.

The power semiconductor switches may have in each case MOSFET switches or IGBT switches or the like. A power semiconductor switch therefore advantageously contains one or more actively switchable semiconductor components, as they can be integrated into a single semiconductor substrate in miniaturized form in large numbers. Said semiconductor substrate may be a MOSFET (metal-oxide-semiconductor field-effect transistor) and/or an IGBT (insulated-gate bipolar transistor) or another suitable semiconductor switch.

In accordance with one development, the difference between the first high-side stray capacitance and the first low-side stray capacitance and/or the difference between the second high-side stray capacitance and the second low-side stray capacitance may have an opposite sign to the difference between the third high-side stray capacitance and the third low-side stray capacitance. In this development, specifically an asymmetry of the inverter module is therefore balanced by virtue of the fact that the input circuit and/or the busbar arrangement is embodied with a correspondingly opposite asymmetry.

In accordance with one development, the difference between the first high-side stray inductance and the first low-side stray inductance and/or the difference between the second high-side stray inductance and the second low-side stray inductance may have an opposite sign to the difference between the third high-side stray inductance and the third low-side stray inductance. This gives rise to advantages corresponding to the above embodiment.

BRIEF DESCRIPTION OF THE DRAWINGS

Further features and advantages of the present invention are explained below on the basis of embodiments in relation to the figures, in which.

DETAILED DESCRIPTION

Figure 1:
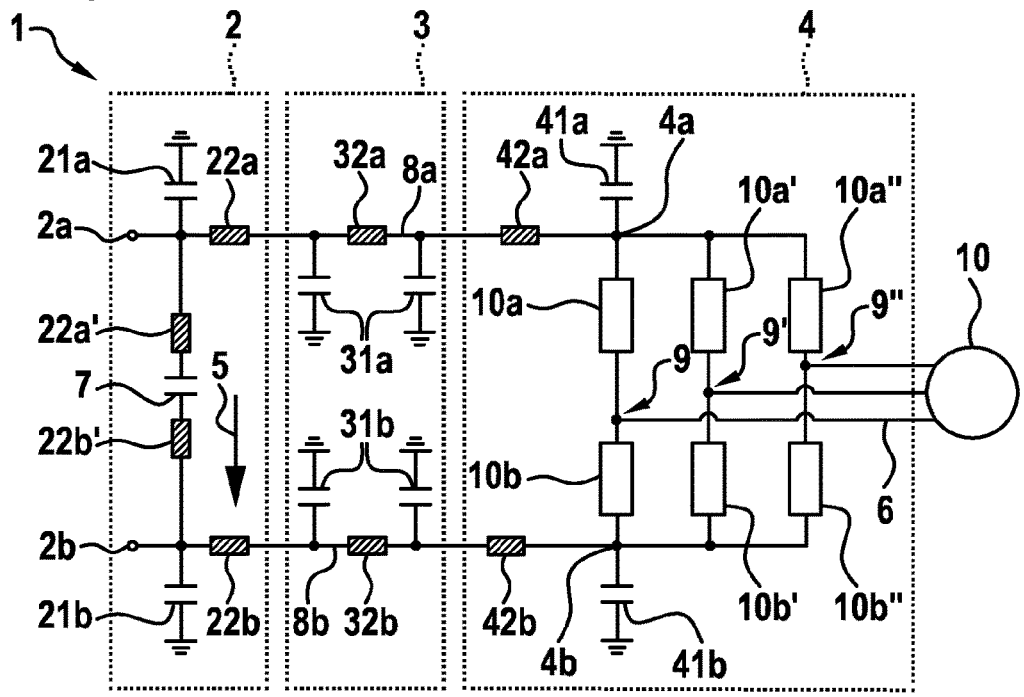
FIG. 1 shows a schematic illustration of an electric machine having a pulse-controlled inverter according to one embodiment of the invention.

In the figures, identical reference numerals denote identical elements or elements having an identical function.

FIG. 1 shows a schematic illustration of an electric machine having a pulse-controlled inverter according to one embodiment of the invention.

In FIG. 1, the reference numeral 1 denotes a pulse-controlled inverter. The pulse-controlled inverter 1 is connected to an electric machine 10 and is embodied to supply said electric machine with a three-phase AC voltage (AC output voltage 6). For example, the electric machine 10 may be a synchronous or asynchronous machine of an electrically driven vehicle such as an electric car or a hybrid electric vehicle. However, it may also be possible here for the electric machine 10 of FIG. 1 to be used in stationary systems, for example in industrial drives, in power plants, in electrical energy recovery units, in energy storage units or similar systems. A further option for use of the electric machine 10 of FIG. 1 are general passenger or commercial vehicles, for example even ships or the like. The three-phase embodiment of the electric machine 10 and of the pulse-controlled inverter 1 can be seen here purely by way of example. The invention may likewise be applied generally to n-phase systems, wherein n is a positive integer.

Here, FIG. 1 schematically illustrates an equivalent circuit diagram of a commutation circuit of the pulse-controlled inverter 1. In principle, said circuit may be divided into an input circuit 2, a busbar arrangement 3 and a three-phase (or generally an n-phase) inverter module 4.

Figure 2:
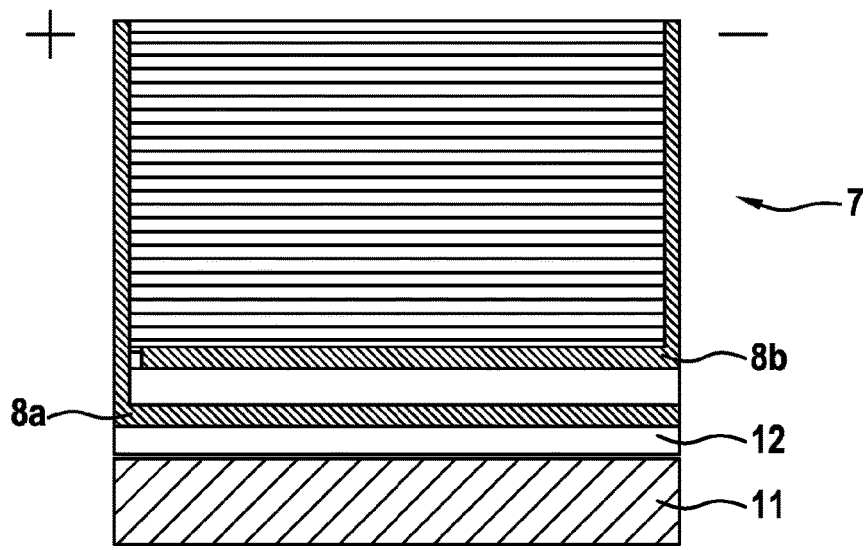
FIG. 2 shows a schematic illustration of a detail of a DC link capacitor having an integrated busbar of a pulse-controlled inverter according to a further embodiment of the invention.

The input circuit 2 is configured to provide a DC input voltage 5 between a high-side input 2a and a low-side input 2b. For example, the two inputs can be energized by a high-voltage battery, a traction battery or an appropriate DC voltage source. Here, this embodiment is not restricted to specific voltage levels. In this simple embodiment, the input circuit 2 effectively only consists of a single DC link capacitor 7. Said DC link capacitor may be embodied as a film capacitor or the like, for example. An exemplary embodiment of the DC link capacitor 7 is shown in FIG. 2 and is described in more detail further below.

The busbar arrangement 3 is configured to electrically connect the high-side input 2a to a high-side connection 4a and correspondingly to electrically connect the low-side input 2b to a low-side connection 4b. In this embodiment, the busbar arrangement 3 comprises two busbars made of copper or aluminum or the like, a high-side busbar 8a and a low-side busbar 8b. Here, the high-side busbar 8a connects the high-side input 2a directly to the high-side connection 4a. Correspondingly, the low-side busbar 8b connects the low-side input 2b directly to the low-side connection 4b.

The inverter module 4 is electrically coupled in turn to the high-side connection 4a and the low-side connection 4b. The inverter module 4 thus receives the DC input voltage 5 at these connections. The inverter module 4 is embodied to convert the DC input voltage 5 into a three-phase AC output voltage 6, which in turn energizes the electric machine 10. The inverter module 4 comprises three bridge branches 9, 9', 9" each having two power semiconductor switches 10a, 10a', 10a", 10b, 10b', 10b". The first bridge branch 9 comprises, for example, the semiconductor switches 10a and 10b, the second bridge branch 9' comprises, for example, the semiconductor switches 10a' and 10b' and the third bridge branch comprises, for example, the semiconductor switches 10a" and 10b". In this case, the semiconductor switches 10a, 10a', 10a" of one bridge side are referred to as high-side switches and the semiconductor switches 10b, 10b', 10b" of the other bridge side are referred to as low-side switches. It should be clear here that any other number of bridge branches or phases, respectively, of the inverter module 4 is likewise possible and that the designation of the semiconductor switches 10a to 10b" as high-side and low-side switches is chosen purely by way of example.

For reasons of clarity, FIG. 1 does not depict the semiconductor switches 10a to 10b" using their circuit symbols, but merely as simple boxes. In this case, the semiconductor switches 10a to 10b" illustrated in FIG. 1 may have field-effect transistors (FETs), for example. In one possible embodiment, the semiconductor switches are in each case IGBTs (insulated-gate bipolar transistors), but it is also possible to provide other semiconductor switches in an appropriate form, for example in the form of JFETs (junction field-effect transistors) or MOSFETs (metal-oxide-semiconductor field-effect transistors). When the semiconductor switches 10a to 10b" have IGBT switches, there may be provision for a diode (not illustrated in FIG. 1 for reasons of clarity) to be connected in anti-parallel with each of the IGBT switches. Here, the way in which the corresponding semiconductor switches 10a to 10b" can be interconnected in detail will be clear to a person skilled in the art.

In principle, the pulse-controlled inverter 1 may have a control regulation system (not illustrated here), which may be configured to generate switching signals that encode switching actuation of the semiconductor switches. Here, the switching signals may have, for example, a logically low level when the semiconductor switches are intended to be open and a logically high level when the semiconductor switches are intended to be closed. By using a control regulation system of this kind it is possible to switch the semiconductor switches 10a to 10b" on and off in a clocked manner such that the inverter module 4 converts the DC input voltage 5 into a three-phase AC output voltage 6. Methods that are used for this purpose are known from the prior art such that they do not need to be discussed in any more detail here.

In addition to their desired electrical properties, all the components of the pulse-controlled inverter 1 that are shown, i.e. the input circuit 2, the busbar arrangement 3 and the inverter module 4, have stray variables as well, i.e. in particular stray capacitances and stray inductances. FIG. 1 thus shows, for the input circuit 2, a first high-side stray capacitance 21a, a first low-side stray capacitance 21b, a first high-side stray inductance 22a, 22a' and a first low-side stray inductance 22b, 22b'. Here, for the first high-side stray inductance 22a, 22a' and the first low-side stray inductance 22b, 22b', FIG. 1 indicates in each case the equivalent series inductance 22a', 22b' of the DC link capacitor 7 and a stray inductance 22a, 22b of the lines separately. The busbar arrangement 3 also has correspondingly a second high-side stray capacitance 31a, a second low-side stray capacitance 31b, a second high-side stray inductance 32a and a second low-side stray inductance 32b. The inverter module 4 likewise has a third high-side stray capacitance 41a, a third low-side stray capacitance 41b, a third high-side stray inductance 42a and a third low-side stray inductance 42b.

The inverter module 4 may have, for example, an asymmetry between the stray variables of the high side and the low side, for example the third high-side stray capacitance 41a may be different from the third low-side stray capacitance 41b and/or the third high-side stray inductance 42a may be different from the third low-side stray inductance 42b. The exact form of the asymmetry may, for example, have been obtained from measurements and/or be determined based on the design or known, for example from simulations or the like. The asymmetries of the inverter module 4 in relation to the stray variables may be balanced by the specific configuration of the input circuit 2 and the busbar arrangement 3 and their respective stray variables. This means that the asymmetry in the inverter module 4 is offset by a targeted "counter-asymmetry" in the input circuit 2 and/or the busbar arrangement 3. The pulse-controlled inverter 1 as a whole system is thus configured symmetrically with regard to the stray variables and the individual components are not each made symmetrical per se. A specific exemplary embodiment is explained below with reference to FIG. 2.

To that end, FIG. 2 shows a schematic illustration of a detail of a DC link capacitor 7 having an integrated busbar 8a, 8b of a pulse-controlled inverter 1 in accordance with a further embodiment of the invention. In principle, the equivalent circuit diagram of this embodiment may be derived from FIG. 1 in unchanged form.

The DC link capacitor 7 illustrated in FIG. 2 may be a film capacitor winding. A multiplicity of individual capacitors is effectively connected in parallel by the winding. At the end faces of the capacitor winding 7 on the left and right in FIG. 2, there are corresponding electrodes (indicated by a plus and minus sign, respectively) for making contact and that are each connected to an associated busbar 8a, 8b. In this embodiment, the busbar arrangement 3 is consequently integrated into the DC link capacitor 7. Furthermore, FIG. 2 indicates an insulation 12 of the DC link capacitor 7 from ground 11.

The inverter module 4 that is connected to said DC link capacitor 7 has an asymmetry with regard to the stray capacitance, for example. In this case, there are various options of configuring the DC link capacitor 7 in such a way that the asymmetries of the inverter module 4 are balanced. To balance the stray capacitances, the following equation must be approximately satisfied:

$$C_{21a}+C_{31a}+C_{41a}=C_{21b}+C_{31b}+C_{41b},$$

whereas to balance the stray inductances, the following equation must be approximately satisfied:

$$L_{22a}+L_{22a'}+L_{32a}+L_{42a}=L_{22b}+L_{22b'}+L_{32b}+L_{42b}.$$

The polarity of the DC link capacitor 7 can be advantageously selected with regard to the balancing in such a way that an asymmetry of the DC link capacitor 7 inherently counteracts the asymmetry of the inverter module 4, i.e. said asymmetry of the inverter module is attenuated and not increased. Furthermore, the geometric configuration of the DC link capacitor 7 can be altered appropriately for precisely adjusting the stray capacitances. For example, for the stray capacitance of a busbar, which is separated from a ground face by an insulation layer, it approximately holds true that:

$$C=\varepsilon_0 * \varepsilon_r * A/d$$

wherein d denotes the thickness of the insulation layer, A denotes the contact surface of the busbar, $\varepsilon_0$ denotes the electrical field constant and $\varepsilon_r$ denotes the dielectric constant. An increase in the thickness d thus leads to a lower stray capacitance. On the other hand, an increase in the dielectric constant leads to a higher stray capacitance. Furthermore, the stray capacitance may be influenced by means of the geometry of the busbars. For example, if A is decreased, for example by virtue of the fact that holes or the like are provided in the busbars, the stray capacitance is accordingly reduced. In general, asymmetries in the stray capacitance or the stray inductance of the inverter module 4 can therefore be balanced by adjusting the internal structure of the DC link capacitor 7 or the geometry of the busbar arrangement 3. The line/busbar lengths are substantially crucial for the stray inductances (inherent inductances) of the components together with their geometric arrangement. Said lengths may be altered in targeted fashion. However, exact balancing may typically be expensive and complex to design. In addition to an empirical procedure by means of measurements etc., it is therefore possible, depending on the use case, to have recourse to simulations, for example.

The invention claimed is:

1. A pulse-controlled inverter (1), having
   an input circuit (2), which is configured to provide a DC input voltage (5) between a high-side input (2a) and a low-side input (2b), wherein the input circuit (2) has a first high-side stray capacitance (21a), a first low-side stray capacitance (21b), a first high-side stray inductance (22a, 22a') and a first low-side stray inductance (22b, 22b');
   a busbar arrangement (3), which is configured to electrically connect the high-side input (2a) to a high-side connection (4a) and to electrically connect the low-side input (2b) to a low-side connection (4b), wherein the busbar arrangement (3) has a second high-side stray capacitance (31a), a second low-side stray capacitance (31b), a second high-side stray inductance (32a) and a second low-side stray inductance (32b); and
   an n-phase inverter module (4), n>1, which is electrically coupled to the high-side connection (4a) and the low-side connection (4b) and is configured to convert the DC input voltage (5) into an n-phase AC output voltage (6), wherein the inverter module (4) has a third high-side stray capacitance (41a), a third low-side stray capacitance (41b), a third high-side stray inductance (42a) and a third low-side stray inductance (42b), wherein a difference between at least one of the first, second, or third high-side stray capacitance and a corresponding first, second, or third low-side stray capacitance is not equal to zero or a difference between at least one of the first, second, and third high-side stray inductance and a corresponding first, second, or third low-side stray inductance is not equal to zero;
   wherein the sum of the first, the second and the third high-side stray capacitance (21a, 31a, 41a) is substantially equal to the sum of the first, the second and the third low-side stray capacitance (21b, 31b, 41b) and the sum of the first, the second and the third high-side stray inductance (22a, 22a', 32a, 42a) is substantially equal to the sum of the first, the second and the third low-side stray inductance (22b, 22b', 32b, 42b).

2. The pulse-controlled inverter (1) as claimed in claim 1, wherein the input circuit (2) comprises a DC link capacitor (7), which provides the DC input voltage (5) between the high-side input (2a) and the low-side input (2b).

3. The pulse-controlled inverter (1) as claimed in claim 2, wherein the DC link capacitor (7) is embodied as a film capacitor.

4. The pulse-controlled inverter (1) as claimed in claim 2, wherein the busbar arrangement (3) is integrated into the DC link capacitor (7).

5. The pulse-controlled inverter (1) as claimed in claim 1, wherein the busbar arrangement (3) comprises a high-side busbar (8a) and a low-side busbar (8b), wherein the high-side busbar (8a) electrically connects the high-side input (2a) to the high-side connection (4a) and the low-side busbar (8b) electrically connects the low-side input (2b) to the low-side connection (4b).

6. The pulse-controlled inverter (1) as claimed in claim 1, wherein the n-phase inverter module (4) has a bridge branch (9, 9', 9") for each phase, each bridge branch comprising a high-side power semiconductor switch (10a, 10a', 10a") and a low-side power semiconductor switch (10b, 10b', 10b").

7. The pulse-controlled inverter (1) as claimed in claim 6, wherein the power semiconductor switches (10a, 10a', 10a", 10b, 10b', 10b") have in each case MOSFET switches or IGBT switches.

8. The pulse-controlled inverter (1) as claimed in claim 1, wherein the difference between the first high-side stray capacitance (21a) and the first low-side stray capacitance (21b), the difference between the second high-side stray capacitance (31a) and the second low-side stray capacitance (31b), or both have an opposite sign to the difference between the third high-side stray capacitance (41a) and the third low-side stray capacitance (41b).

9. The pulse-controlled inverter (1) as claimed in claim 1, wherein the difference between the first high-side stray inductance (22a, 22a') and the first low-side stray inductance (22b, 22b'), the difference between the second high-side stray inductance (32a) and the second low-side stray inductance (32b), or both have an opposite sign to the difference between the third high-side stray inductance (42a) and the third low-side stray inductance (42b).

10. An n-phase electric machine (10), wherein n>1, having a pulse-controlled inverter (1) as claimed in claim 1, wherein the n-phase electric machine is coupled to the n-phase AC output voltage (6) of the pulse-controlled inverter (1).

\* \* \* \* \*